United States Patent
Shah et al.

(10) Patent No.: US 9,087,068 B1
(45) Date of Patent: Jul. 21, 2015

(54) PROXIMITY BASED LOSSLESS COMPRESSION OF CLIENT INFORMATION IN A NETWORK DEVICE

(75) Inventors: Mehul S. Shah, Milpitas, CA (US); J. Eric Mowat, Piedmont, CA (US); Szu-Wen Kuo, Milpitas, CA (US)

(73) Assignee: NetApp, Inc., Sunnyvale, CA (US)

( * ) Notice: Subject to any disclaimer, the term of this patent is extended or adjusted under 35 U.S.C. 154(b) by 1553 days.

(21) Appl. No.: 12/414,605

(22) Filed: Mar. 30, 2009

Related U.S. Application Data (63) Continuation of application No. 10/774,214, filed on Feb. 5, 2004, now Pat. No. 7,533,108.

(60) Provisional application No. 60/502,765, filed on Sep. 12, 2003.

(51) Int. Cl.
*G06F 17/30* (2006.01)

(52) U.S. Cl.
CPC .............................. *G06F 17/30153* (2013.01)

(58) Field of Classification Search
None
See application file for complete search history.

(56) References Cited

U.S. PATENT DOCUMENTS

| | | | |
|---|---|---|---|
| 5,652,857 A * | 7/1997 | Shimoi et al. ................. | 711/113 |
| 5,774,715 A * | 6/1998 | Madany et al. ........................ | 1/1 |
| 6,212,570 B1 | 4/2001 | Hasebe et al. | |
| 7,453,883 B1 * | 11/2008 | Lynch et al. ............. | 370/395.32 |
| 2002/0038360 A1 * | 3/2002 | Andrews et al. .............. | 709/223 |
| 2002/0129086 A1 * | 9/2002 | Garcia-Luna-Aceves et al. ............................ | 709/200 |
| 2002/0172203 A1 | 11/2002 | Ji et al. | |
| 2006/0106940 A1 * | 5/2006 | Jagannathan et al. ........ | 709/238 |

* cited by examiner

*Primary Examiner* — Anh Tai Tran
(74) *Attorney, Agent, or Firm* — Perkins Coie LLP (57) ABSTRACT

Information representing a plurality of clients on a network is stored in a data structure. The data structure may be stored within a server or agent in a content delivery network and may include client network address information. The data structure is dynamically compressed based on network proximity information relating to the clients.

13 Claims, 5 Drawing Sheets

PROXIMITY BASED LOSSLESS COMPRESSION OF CLIENT INFORMATION IN A NETWORK DEVICE

This is a continuation of U.S. patent application Ser. No. 10/774,214 filed on Feb. 5, 2004 and entitled, "Proximity Based Lossless Compression of Client Information in a Network Device," which claims the benefit of U.S. Provisional Patent application No. 60/502,765 filed on Sep. 12, 2003 and entitled, "Proximity Based Lossless Table Compression for Request Re-directing Servers," which are incorporated herein by reference.

FIELD OF THE INVENTION

At least one embodiment of the present invention pertains to content delivery networks (CDNs), and more particularly, to proximity based lossless compression of client information in a network device.

BACKGROUND

A CDN is a geographically distributed network for delivering network content. Network content can include video, still images, text, sound, software, and numerous other types of electronic data. CDNs can include request routing servers and request routing agents positioned at various locations around the world. The request routing servers and agents work together to provide network content to clients.

Request routing servers and agents are typically used to increase the speed with which clients receive requested network content. In certain network configurations, when a client requests network content, a request routing server provides the Internet Protocol (IP) address of the nearest request routing agent that is able to serve the content. Using the IP address, the client requests the content from the nearby request routing agent.

CDNs may rely on network proximity measurements (network proximity is a measure of temporal proximity or latency) to route content requests to the request routing agents in closest proximity to the requesting clients. Network proximity is often actively measured. When proximity is actively measured, a request routing agent typically sends probe messages to a client agent. In response to receiving the probe messages, the client agent typically sends reply messages back to the request routing agent. Proximity is measured from the delay between when the request routing agent sends a probe message and when the request routing agent receives a reply to the probe message. Based on this message exchange, a request routing agent can estimate its proximity to the client agent. Request routing agents report these proximity estimates to the request routing servers, so that the request routing servers can determine which request routing agents are nearest to certain clients.

Request redirecting/routing servers, such as in the Global Request Manager (GRM) made by Network Appliance, Inc. in Sunnyvale, Calif., can redirect a client request based on proximity and policy. In order to redirect client requests correctly, client IP address and proximity information is stored in one or more tables in a request routing server and/or agent. This information is used by the server to determine the best surrogate (network cache) to provide content to a particular client. If the number of clients served by a CDN is large, the tables that maintain the client IP address and proximity information can become very large and thus unmanageable and may give rise to resource (memory) contention issues. Table size is particularly problematic in the request routing server if the system is configured for application-level ("level 7") redirection, where the server maintains information for all clients that it serves.

Conventional systems work around this problem by reducing the number of client IP addresses stored by storing the prefix information and subnet mask. That approach helps constrain the size of the table, however, it suffers a drawback that reduces its effectiveness in re-directing clients accurately.

Assume, for example, that a conventional redirection system has two IP addresses: 202.54.1.18 and 202.54.1.30. The conventional system might treat all IP addresses with the same 28-bit prefix as a single entry. Thus, both of the above mentioned IP addresses end up being stored as a single entry in the redirection system table. Let us further assume that the proximity of the two IP addresses was different with respect to the surrogates due to subnetting. Because the conventional redirection system would store both IP addresses as a single prefix, it would be unable to redirect one of them correctly in the most optimal way, reducing the effectiveness of the request redirection system. A drawback conventional redirection systems suffer, therefore, is that they are unable to detect the subnetting information dynamically.

SUMMARY OF THE INVENTION

The present invention includes a method and a related apparatus, the method comprising storing in a data structure information representing a plurality of clients on a network, and dynamically compressing the data structure based on network proximity information relating to the clients.

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

A method and apparatus for lossless compression of client information in a network device are described. Note that in this description, references to "one embodiment" or "an embodiment" mean that the feature being referred to is included in at least one embodiment of the present invention. Further, separate references to "one embodiment" or "an embodiment" in this description do not necessarily refer to the same embodiment; however, such embodiments are also not mutually exclusive unless so stated, and except as will be readily apparent to those skilled in the art from the description. For example, a feature, structure, act, etc. described in one embodiment may also be included in other embodiments. Thus, the present invention can include a variety of combinations and/or integrations of the embodiments described herein.

In a CDN which supports both domain name service (DNS) and application level redirection, client state tables can become very large. The solution introduced herein solves this problem by dynamically detecting subnet information based on network proximity, and then compressing client state tables based on the subnet information. The compression is lossless, in that all of the original information can be recovered. The solution allows table size to be reduced, without sacrificing correct redirection of clients and without creating resource contention issues.

Figure 1:
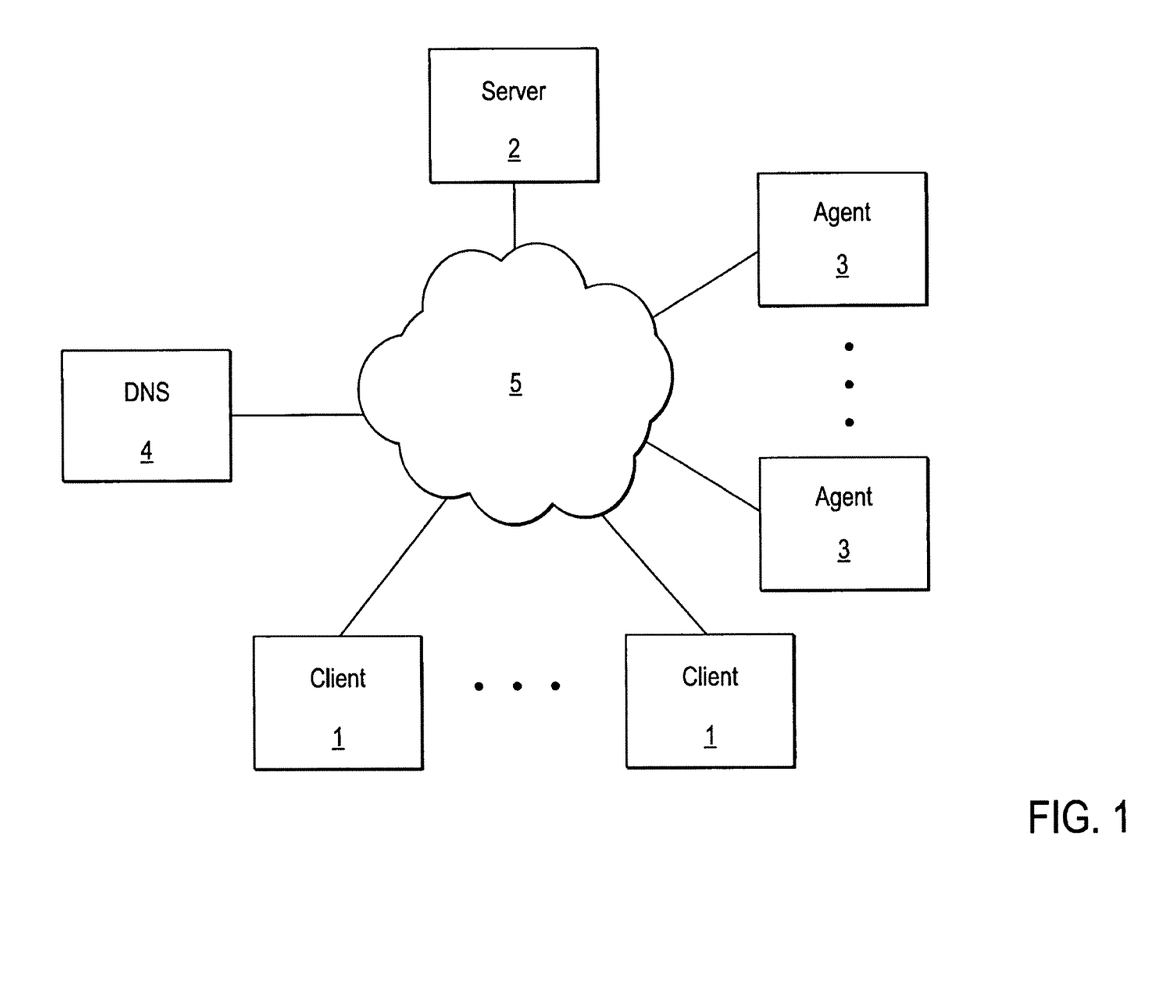
FIG. 1 shows an example of a CDN environment.

FIG. 1 shows an example of a CDN environment in which the invention can be implemented. The environment includes a number of clients 1, a request routing server 2, a number of request routing agents 3, and a DNS 4, connected to each other by a network 5. The network 5 may be or include, for example, the Internet, a wide area network (WAN), a corporate intranet, a local area network (LAN), or some combination thereof. Thus, the network 5 may actually include multiple networks. In certain embodiments, the request routing server (hereinafter simply "server") 2 handles redirection of client content requests (such as in application-level redirection), and each request routing agent (hereinafter simply "agent") 3 does periodic proximity measurements ("probes") to the clients on behalf of the server and reports the probe results to the server. The agents 3 also function as network content caches and content delivery agents (also called "surrogates"), in that they deliver cached content to particular clients 1 in response to redirected client requests.

Figure 2:
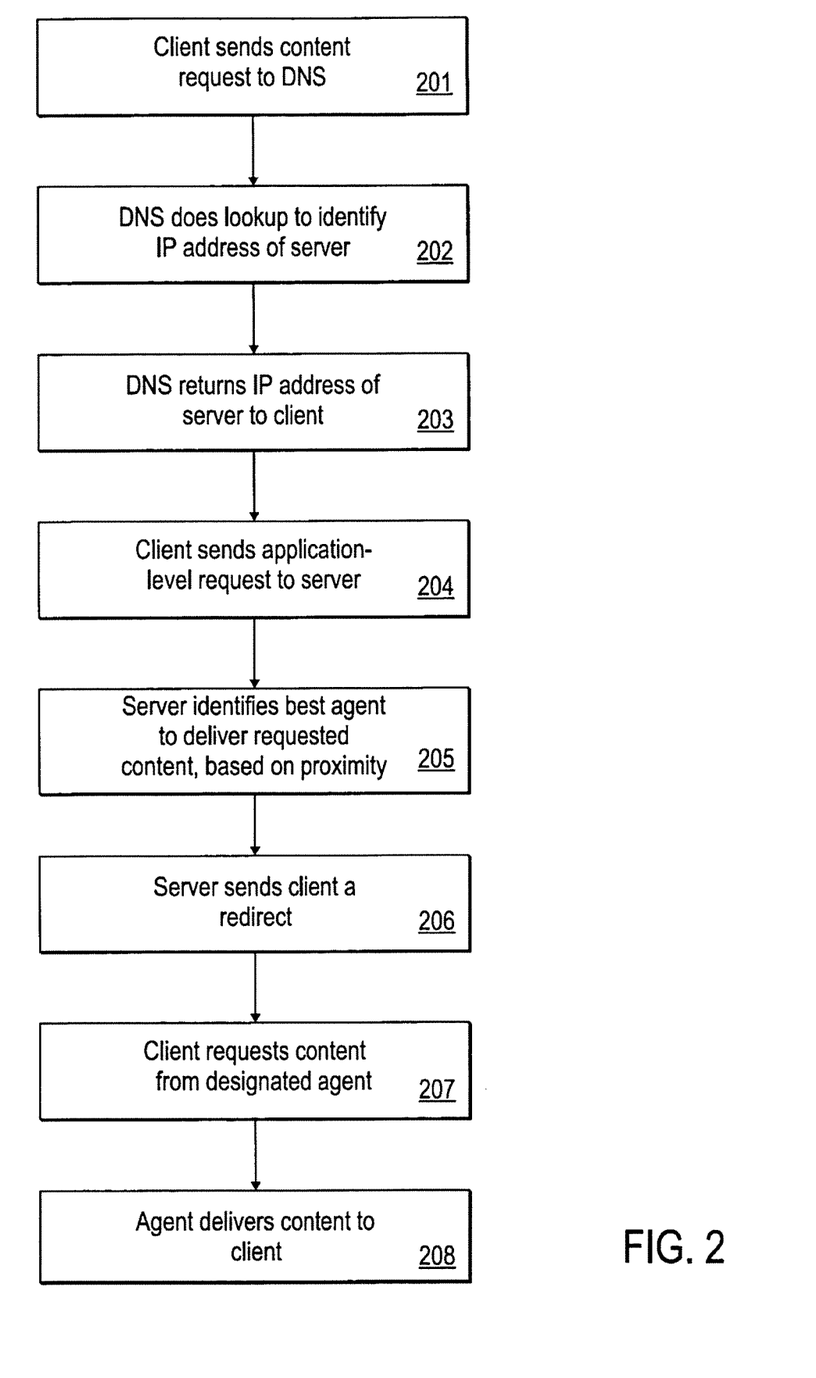
FIG. 2 illustrates a process representing an example how the CDN of FIG. 1 may be employed with application-level redirection.

The process shown in FIG. 2 represents an example how the CDN of FIG. 1 may be employed with application-level redirection. Note that such a CDN may alternatively (or additionally) be employed with DNS-level redirection. Initially, at block 201 a client 1 sends to the DNS 4 a content request, which includes a domain name. At block 202 the DNS 4 does a lookup based on the domain name to identify the IP address of the server 2. The DNS 4 then returns the IP address of the server 2 to the requesting client 1 at block 203. At block 204 the client 1 then sends an application level (e.g., HTTP) request to the server 2. The server 2 uses its stored client state tables at block 205, including the proximity information, to identify the best agent 3 to deliver the requested content to the client 1 (i.e., the "closest" agent 3 to the requesting client 1 in terms of network proximity). Once the best agent 3 is identified, the server 2 sends the client 1 a redirect to that agent 3 at block 206. The client then requests the content from the designated agent at block 207, which delivers the content to the client 1 from the agent's local cache at block 208.

Client state tables are maintained in the server 2 and in each agent 3 (a little different in each of them), as described below. In general, each agent 3 maintains a client state table that includes (at least initially) a separate entry for each client (host) 1 that it is capable of serving. Each entry includes the IP address of the client 1, the measured network proximity from the agent 3 to the client 1, and a bitmap mask. Thus, for purposes of describing the present invention, the client state table in an agent 3 may have the following format:

| Primary IP Address | Proximity | Bitmap Mask |
| --- | --- | --- |

When a client 1 is initially discovered by an agent 3, the agent 3 adds an entry for that client 1 to the agent's client state table. This includes adding the IP address of the client 1 to the table and generating the bitmap mask for the client 1 in the manner described below.

The server 2 sends probe commands to the agents 3, which carry out the probes to determine their proximity to the clients 1 and then send responses back to the server 2. The responses from an agent 3 to the server 2 contain the proximity information and the bitmap masks. The agents 3 also add the proximity information to their tables.

Representation of Compressed IP Addresses

The IP addresses and proximity information are used to compress client state tables in the agents 3 and in the server 2. The bitmap masks help to identify compressed (merged) table entries. In certain embodiments, each bitmap mask is a 64-bit value ranging from 0x0 to 0xFFFFFFFFFFFFFFFF (where the prefix "0x" indicates hexadecimal notation). Note that in other embodiments of the invention, masks with a different number of bits may be used. Each bit in the bitmap mask potentially represents a compressed IP address based on a primary IP address associated with the table entry.

In certain embodiments, the bitmap mask for each table entry is initially generated based on the host identifier (the lowest-order 6 bits) portion of the IP address for that entry. More specifically, for an IP address of W.X.Y.Z, where Z represents the host portion of the IP address, the bitmap mask is computed as the hexadecimal encoding of $2^Z$. So as a more concrete example, the mask for the IP address 10.56.10.2 would be $2^2=4=$0x0000000000000004. Similarly, the mask for the IP address 10.56.10.3 would be $2^3=8=$0x0000000000000008.

Table entries are merged if they are determined to be on equivalent subnets. In that event, the mask of the surviving merged entry is modified to indicate that the table entry now represents two or more clients. In the case of merged entries, the bitmap masks help to identify equivalence between table entries. For example, assume that a table entry has an IP address of 202.54.1.1 and a bit map mask of 0x8000000000000002. This indicates that the table entry represents IP address 202.54.1.1 and IP address 202.54.1.63 and that these two IP addresses are equivalent.

Using this technique with a 64-bit mask, it is possible to compress up to 64 table entries into a single table entry. The compression is lossless, since all of the original information can be recovered. This technique also allows the flexibility of two entries with the same IP address prefix (highest-order 26 bits) to have different proximity information. Note that in other embodiments of the invention, masks with a different number of bits may be used.

Agent Processes

The agents 3 detect subnets based on the proximity measurements and compress the table entries upon detecting the equivalence. In certain embodiments, equivalence is detected if two or more entries have the same subnet prefix (e.g., same highest-order 24 bits of their IP addresses) and their measured network proximities are within a predetermined range of each other. The agents 3 report the primary IP address, the compressed mask (e.g., a 64 bit bitmap) and the proximity to the server 2.

Assume an agent 3 receives a probe request from the server 2 for IP addresses 202.54.1.18 and 202.54.1.30. The agent 3 may represent these in its table initially as:

| Primary IP Address | Mask | Proximity (msec) |
|---|---|---|
| 202.54.1.18 | 0x0000000000040000 | 0 |
| 202.54.1.30 | 0x0000000040000000 | 0 |

Since the agent 3 has initially never tried measuring the proximity of these clients, they are initially represented as having proximity of 0. The mask represents the host portion 8 bits of the IP address.

After the agent 3 does the proximity measurement, the table might appears as follows:

| Primary IP address | Mask | Proximity |
|---|---|---|
| 202.54.1.18 | 0x0000000000040000 | 20 |
| 202.54.1.30 | 0x0000000040000000 | 21 |

Agent Merge

The agent 3 now detects that the IP addresses 202.54.1.18 and 202.54.1.30 are equivalent, since the measured proximities are within a close range of each other. The agent 3 thus assumes these are part of the same subnet and, therefore, merges these two entries. In a merge (compress) operation, the agent 3 generates the bitmap mask M of the merged table entry as the logical OR of the two starting bitmap masks A1 and A2, i.e.:

$$M = A1 \text{ OR } A2$$

Therefore, in the current example, the agent 3 compresses the table to:

| Primary IP address | Mask | Proximity |
|---|---|---|
| 202.54.1.18 | 0x0000000040040000 | 20 |

The agent 3 then informs the server 2 about the new mask and proximity, which indicate that 202.54.1.18 and 202.54.1.30 are equivalent, since they share the same entry with a different mask.

Agent Split

A split operation occurs when the agent 3 does a probe on a merged entry and finds a different proximity. A split operation denotes detecting inequivalence between a previous merge, possibly due to an incorrect deduction or due to a change in network conditions. Thus, the type of compression described herein can adapt to changing network conditions while enabling clients to be redirected to the best possible surrogate.

As an example of a split operation with reference to the above example, the agent 3 might probe 202.54.1.30 after some time and find a new proximity of 8 ms. Since this is not equivalent, the agent 3 does a split operation on the previously-merged entry. In the agent's split operation, Old mask=Old mask AND NOT Changed mask. Hence, in the above example, the resulting table would appear as follows:

| Primary IP address | Mask | Proximity |
|---|---|---|
| 202.54.1.18 | 0x0000000000040000 | 20 |
| 202.54.1.30 | 0x0000000040000000 | 8 |

After the split, the agent 3 creates a new table entry with 202.54.1.30 as the primary IP address and updates the proximity and the mask for both the old and new entry. Thus the agent 3 does a merge or a split when the proximity to a client 2 that it is probing changes for a merged entry. The merge operation denotes detecting equivalence between IP addresses being on the same subnet. A split operation denotes detecting inequivalence between a previous merge.

Figure 3:
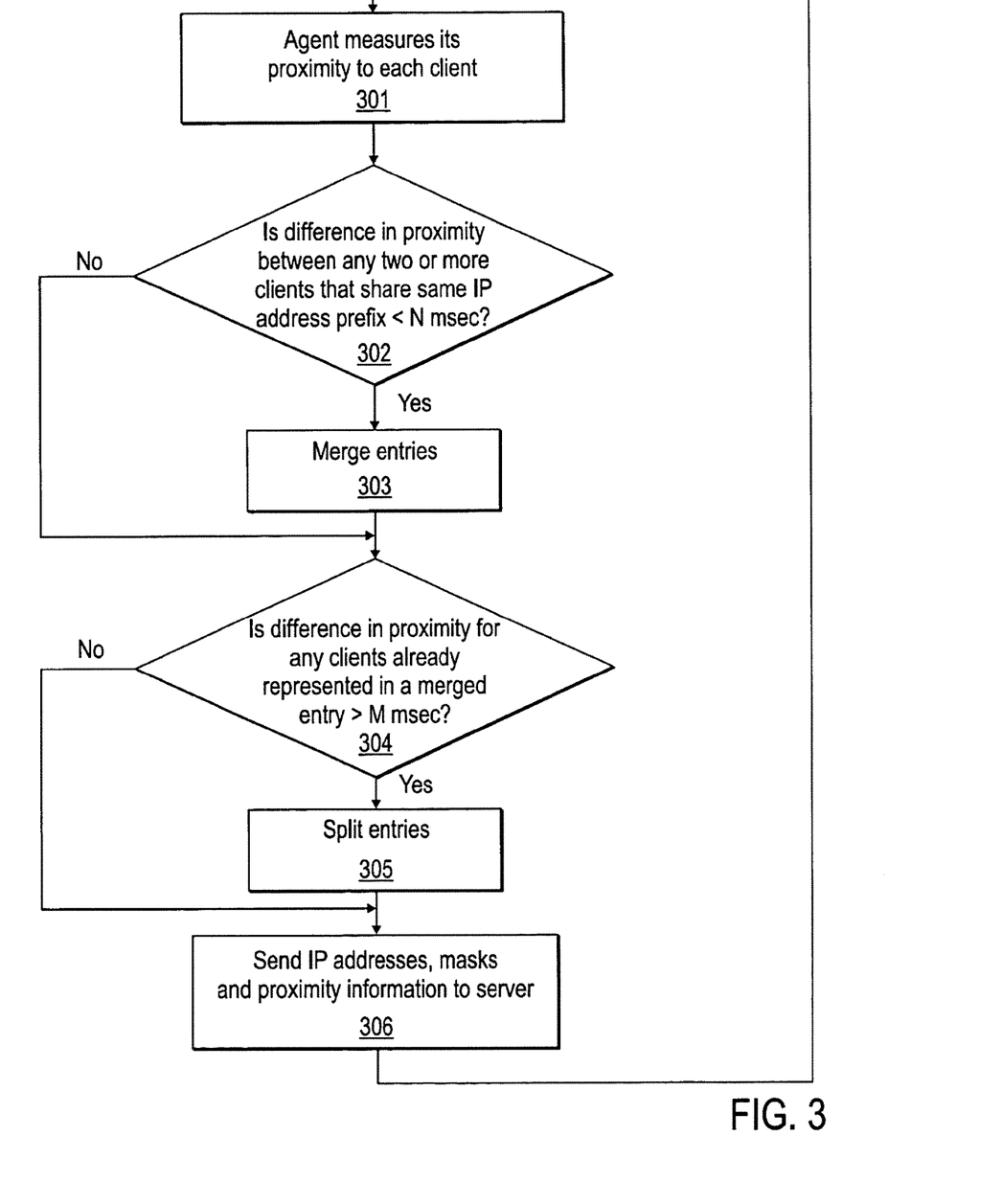
FIG. 3 illustrates the overall process performed by an agent with respect to maintaining client state tables, according to certain embodiments of the invention.

Thus, the overall process performed by an agent 3 with respect to maintaining client state tables is represented in FIG. 3. An agent 3 measures its proximity to each client 1 at block 301 (this may or may not be in direct response to a server command). At block 302 the agent 3 determines whether the difference in proximity between any two or more clients 1 that share the same IP address prefix is less than a predetermined amount of time (e.g., N msec). If so, then at block 303 the agent 3 merges those entries in the manner described above. Otherwise, the process proceeds to block 304. In block 304 the agent 3 determines whether the difference in proximity for any clients 1 that are already represented in a merged entry is greater than a predetermined amount of time (e.g., M msec, where M can equal N, but not necessarily). If so, then at block 305 the agent 3 splits out the entry for the client 1 which no longer conforms to the proximity of the merged entry into a separate entry, in the manner described above. Otherwise the process proceeds to block 306. At block 306 the agent 3 sends the IP addresses, masks and proximity information to the server 2. The process repeats.

Server Processes

For purposes of describing this invention, each table entry in the server 2 contains a primary IP address, a 64-bit master bitmap mask, and for each of the agents 3 (caches, or surrogates), the proximity of that agent 3 to the client 1 and its respective bitmap mask. Thus, in a simple network with one server 2 and two agents 3 ("Agent A" and "Agent B"), the server table can be represented as:

| Primary IP address | Master IP address mask | Agent A mask | Agent B mask |
|---|---|---|---|
| | M1 | A1 | B1 |
| | M2 | A2 | B2 |

The variables M1, M2, A1, A2, B1 and B2, in certain embodiments, are all 64 bit masks. The master IP address mask M for a table entry x is generated as the logical AND of the individual bitmap masks reported by each of the agents for that IP address after their proximity measurements, i.e., $Mx = Ax \text{ AND } Bx$.

Server Merge

Assume that the server 2 asked Agents A and B to probe 202.54.1.18 and 202.54.1.30, and these agents reported the following masks:

| Master IP address mask | Agent A mask | Agent B mask |
|---|---|---|
| 0x0000000000040000 | 0x0000000000040000 | 0x0000000000040000 |
| 0x0000000040000000 | 0x0000000040000000 | 0x0000000040000000 |

This indicates that Agents A and B have not detected that these clients are on equivalent subnets. After some time, assume Agent A detects equivalence and sends the following to the server 2:

| Master IP address mask | Agent A mask | Agent B mask |
| --- | --- | --- |
| 0x0000000000040000 | 0x0000000040040000 | 0x0000000000040000 |
| 0x0000000040000000 | 0x0000000040040000 | 0x0000000040000000 |

Note that Mx=Ax AND Bx. The server 2 updates every entry in the new reported mask newAx, with the mask newAx. After some time, Agent B detects equivalence and sends:

| Master IP address mask | Agent A mask | Agent B mask |
| --- | --- | --- |
| 0x0000000000040000 | 0x0000000040040000 | 0x0000000040040000 |
| 0x0000000040000000 | 0x0000000040040000 | 0x0000000040040000 |

The server 2 then computes the new master mask:

| Master IP address mask | Agent A mask | Agent B mask |
| --- | --- | --- |
| 0x0000000040040000 | 0x0000000040040000 | 0x0000000040040000 |
| 0x0000000040040000 | 0x0000000040040000 | 0x0000000040040000 |

Since M1x and M2x are equivalent, the server 2 decides to merge these table entries to:

| Master IP address mask | Agent A mask | Agent B mask |
| --- | --- | --- |
| 0x0000000040040000 | 0x0000000040040000 | 0x0000000040040000 |

This indicates that IP address 202.54.1.18 and 202.54.1.30 are equivalent and compressed into a single table entry on the server 2.

Server Split

The server 2 performs a split operation when any agent 3 informs a different mask that changes the master mask of the server 2. Assume that the server 2 has detected equivalence between 202.54.1.18 and 202.54.1.30 and stored the following masks in its table:

| Master IP address mask | Agent A mask | Agent B mask |
| --- | --- | --- |
| 0x0000000040040000 | 0x0000000040040000 | 0x0000000040040000 |

Assume further that Agent A now detects inequivalence between 202.54.1.18 and 202.54.1.30 (based on proximity) and reports the new masks with new proximities 12 and 27 msec respectively. In that case, the server 2 splits the table as follows:

| Master IP address mask | Agent A mask | Agent B mask |
| --- | --- | --- |
| 0x0000000000040000 | 0x0000000000040000 | 0x0000000040040000 |
| 0x0000000040000000 | 0x0000000040000000 | 0x0000000040040000 |

Figure 4:
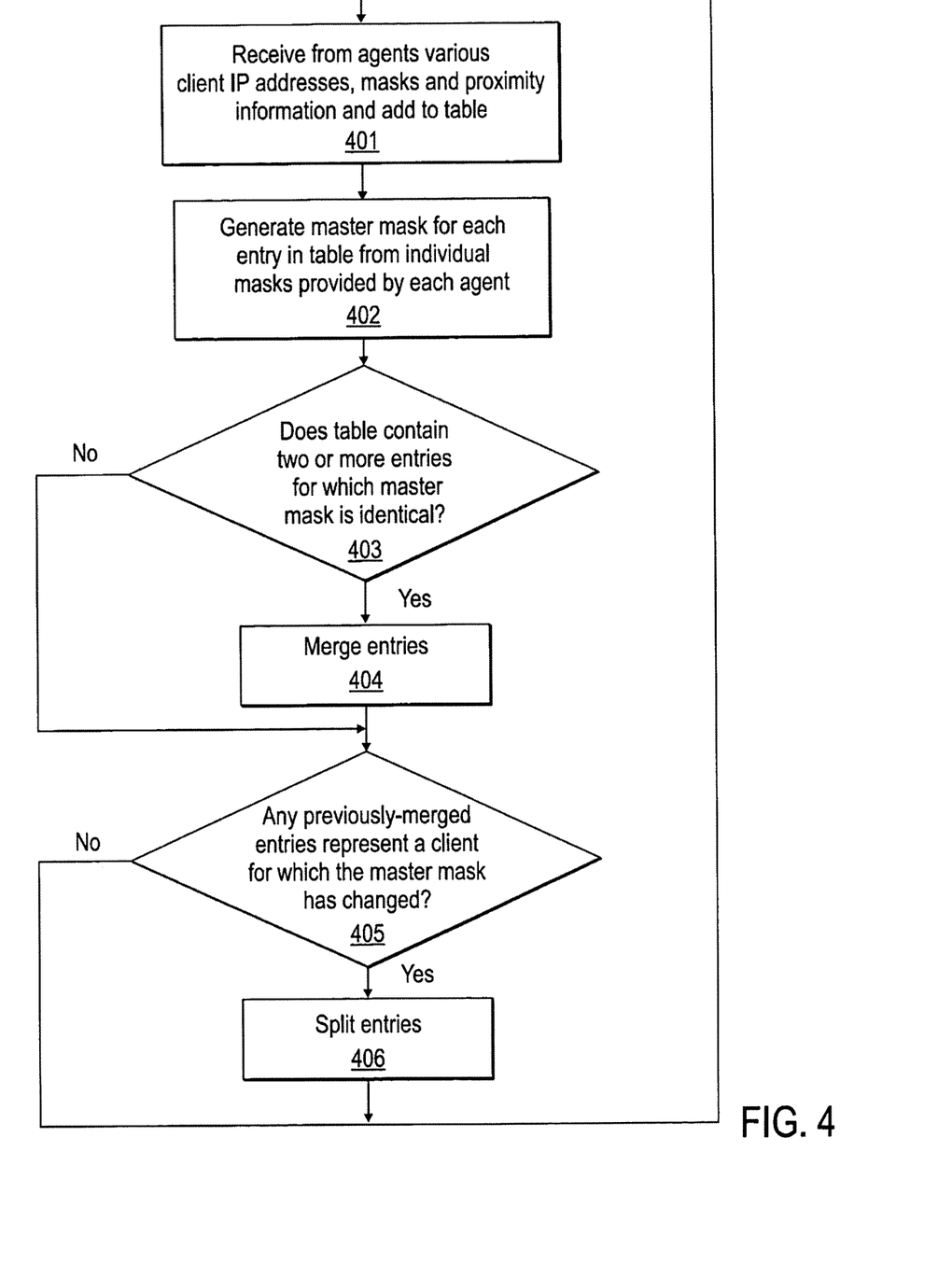
FIG. 4 illustrates the overall process performed by the server with respect to maintaining client state tables, according to certain embodiments of the invention.

Thus, the overall process performed by the server with respect to maintaining client state tables is represented in FIG. 4. At block 401 the server 2 receives from the agents various client IP addresses, masks and proximity information and adds this information to its client state table. At block 402 the server generates a master mask for each entry in the table from the individual masks provided by each agent for that entry. At block 403 the server determines if the table contains two or more entries for which the master mask is identical. If so, then the server merges those entries at block 404 in the manner described above. Otherwise, the process proceeds to block 405. In block 405, the server determines whether any previously-merged entries represent a client for which the master mask has changed. If so, the server splits out any such entries at block 406 in the manner described above. The process then repeats.

Thus, the server 2 merges and splits entries based on the masks reported by the agents 3. The server 2 merges entries when all agents 3 report the same subnet information for two or more clients 1 and splits when any one agent 3 reports different information. The agents 3 themselves merge or split entries based on their measured proximity to the clients 1.

The ability to detect subnets dynamically and to compress the client state tables based on this information allows scaling of a content delivery system by several orders of magnitude without compromising effectiveness/correctness.

Various modifications and extensions of the above-described are possible. For example, as noted above, a mask size of other than 64 bits can be used. In certain embodiments, the server 2 may not require all master masks to be identical in order to merge entries. In certain embodiments, all of the IP addresses and the masks can be stored separately. Consider a table having four agents 3 and having 64 IP addresses, the amount of storage per IP address would be 4*4=16 bytes, assuming 4 bytes per entry. For 64 entries, we would have 64*16=1024 bytes. Another approach would be to track only a single/26 mask and lose the other information (resulting in loss of accuracy). In certain embodiments, it may be desirable to confirm proximity measurements before performing a merge and/or to confirm changes in proximity measurements before performing a split.

Figure 5:
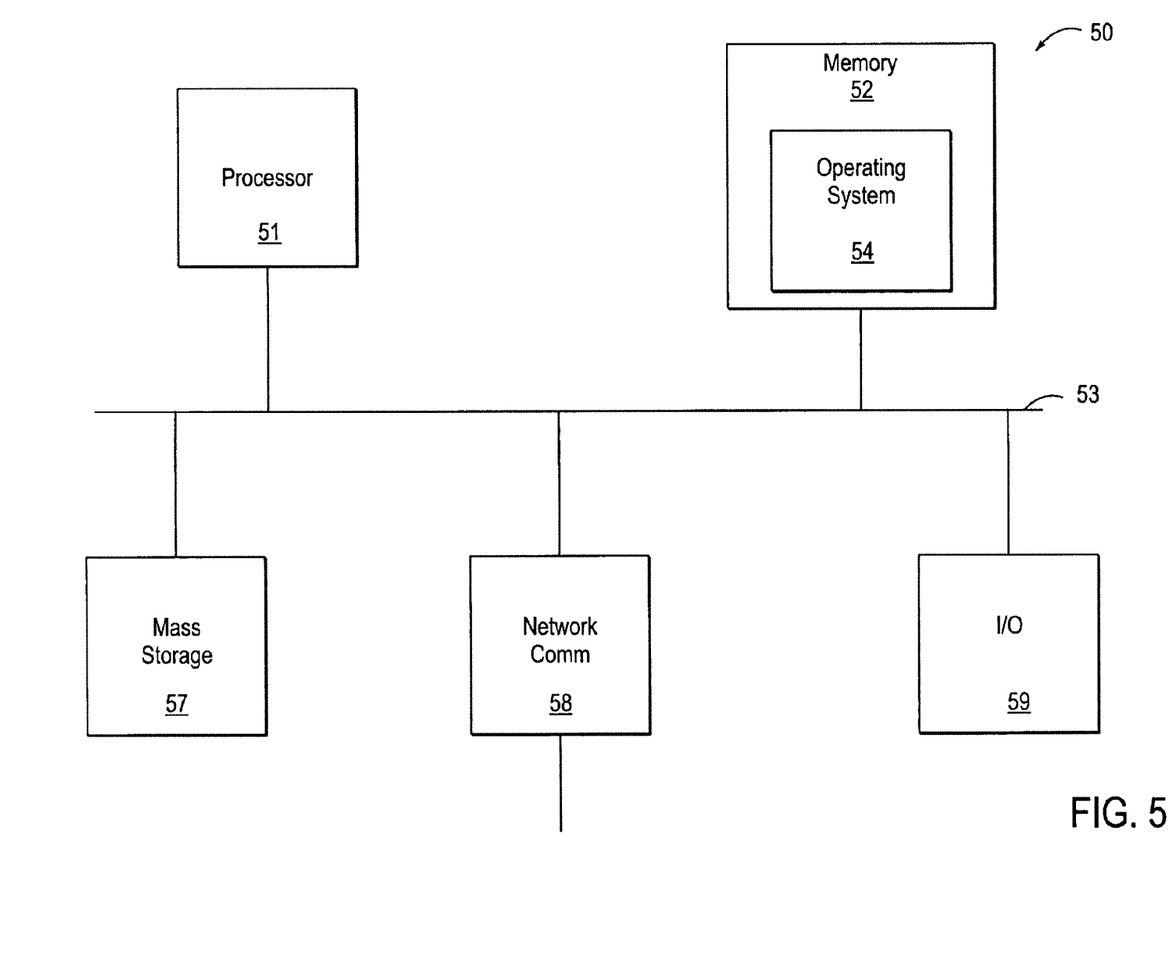
FIG. 5 is a high-level block diagram of a processing system such as an agent or server.

The techniques described above can be implemented within the agents 3 and server 2 using software, special-purpose hardware, or a combination of software and special-purpose hardware. FIG. 5 shows the architecture of a processing system that can represent the server 2 and/or any of the agents 3. Note that certain standard and well-known components which are not germane to the present invention are not necessarily shown. The processing system 50 includes one or more processors 51 and one or more memories 52, coupled together by a bus system 53. The bus system 53 in FIG. 5 is an abstraction that can represents any one or more separate physical buses and/or point-to-point connections, connected by appropriate bridges, adapters and/or controllers. The bus system 53, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processor 51 is the central processing unit (CPU) of the processing system 50 and, thus, controls the overall operation of the processing system 50. In certain embodiments, the processor 51 accomplishes this by executing software stored in memory 52, which may include software and data embodying the techniques described above. The processor 51 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 52 can represent any of various forms of random access memory (RAM), read-only memory (ROM), flash memory, etc., or a combination thereof. Memory 52 stores, among other things, the operating system 54 of the processing system 50. The above described techniques and processes may be implemented within the operating system 54, although that is not necessarily the case. Hence, tables such as described above may also be stored in memory 52.

Also connected to the processor 51 through the bus system 53 are one or more mass storage devices 57, one or more network communication devices 58, and in some embodiments, one or more other input/output (I/O) devices 59. The network communication device 58 provides the processing system 50 with the ability to communicate with remote processing devices over a network and may be, for example, an Ethernet adapter, a digital subscriber loop (DSL) adapter, or the like. The mass storage device 57 may be or include any of various forms of magnetic disk, optical disc (e.g., a CD-ROM, DVD, etc.), etc.

Thus, a method and apparatus for lossless compression of client information in a network device have been described. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
   receiving at a network server information relating to a plurality of clients on a network, the information including a plurality of network addresses and a corresponding plurality of masks, each of the network addresses representing one or more of the clients, each of the masks being indicative of a network proximity-based compression state of received information relating to the clients, each of the masks including a plurality of fields, each of the fields corresponding to a different client of the plurality of clients;
   storing the received information relating to the plurality of clients in a data structure; and
   dynamically compressing the data structure in the network server based on the masks.

2. A method as recited in claim 1, wherein said receiving information comprises receiving a plurality of masks for each of the network addresses, each of the masks being indicative of a proximity-based compression state for a corresponding network address, each of the masks corresponding to a different one of a plurality of request rooting agents.

3. A method as recited in claim 1, wherein said received information relating to a plurality of clients on a network includes network proximity measurements representing measured proximities between clients and a plurality of content delivery agents; and
   wherein said dynamically compressing the data structure in the network server based on the masks further comprises:
   compressing a plurality of entries in the data structure in the network server when a difference between network proximity measurements corresponding to the plurality of entries is less than a specified value.

4. A method as recited in claim 1, wherein the network server is a request routing server.

5. A method as recited in claim 4, wherein the information representing a plurality of clients is received from a plurality of content delivery agents on the network.

6. A method as recited in claim 1, further comprising generating a master mask for each of the network addresses, based on the plurality of masks;
   wherein said dynamically compressing the data structure based on the masks comprises dynamically compressing the data structure based on the master masks.

7. A method as recited in claim 6, wherein said dynamically compressing the data structure comprises, if the master mask is identical for two or more entries in the data structure, then merging the two or more entries in the data structure.

8. A method as recited in claim 1, further comprising decompressing the data structure.

9. A method as recited in claim 8, wherein said decompressing the data structure comprises splitting a merged entry in the data structure representing at least two of the clients into a plurality of separate entries.

10. A method as recited in claim 8, wherein said decompressing the data structure comprises decompressing the data structure in response to a detected change in network conditions.

11. A content delivery system comprising:
    a plurality of agents to deliver content to a plurality of clients via a network, each agent configured to acquire network proximity information relating to each of the clients, to store in a first data structure information representing the plurality of clients, the information stored in the first data structure including a plurality of masks, each of the masks being indicative of a network proximity-based compression state of acquired information relating to the clients, each of the masks including a plurality of fields, each of the fields corresponding to a different client of the plurality of clients, and to dynamically compress the first data structure based on the network proximity information; and
    a server to receive from the agents information relating to the clients, including the network proximity information, and to cause redirection of content requests from the clients to appropriate ones of the agents, based on the network proximity information.

12. A content delivery system as recited in claim 11, wherein the server is further configured to store the information relating to the clients in a second data structure and to dynamically compress the second data structure based on the masks.

13. A content delivery system as recited in claim 11, wherein said acquired network proximity information relating to each of the clients includes network proximity measurements representing measured proximities between said plurality of clients and said plurality of agents; and
    wherein said plurality of agents are further configured to dynamically compress entries in the first data structure when a difference between network proximity measurements corresponding to the entries in the first data structure is less than a specified value.

* * * * *